April 12, 1932.    O. HELLMANN    1,854,161
OVEN FOR TREATMENT OF FUEL BY HEAT
Filed June 1, 1927    2 Sheets-Sheet 1
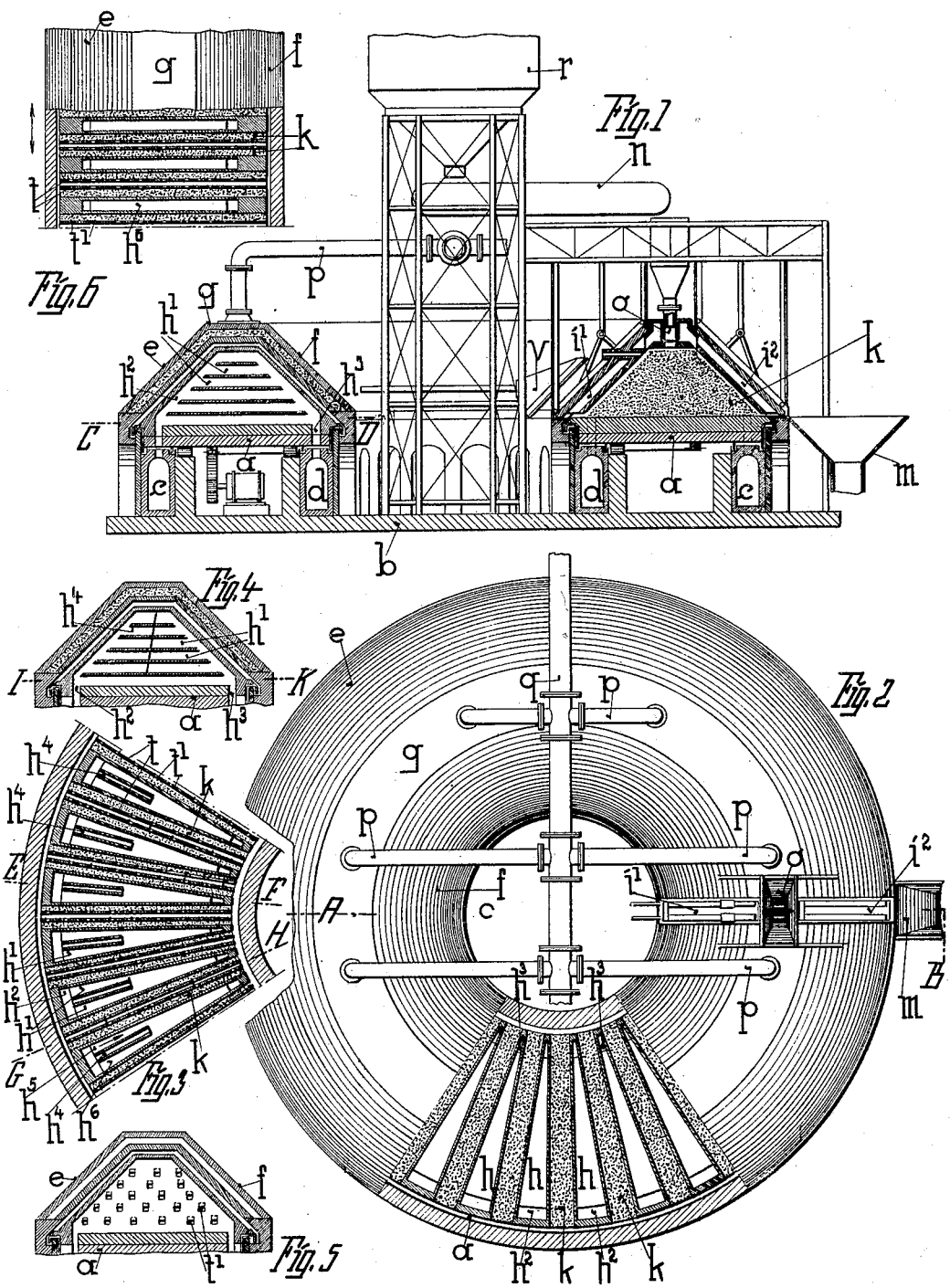

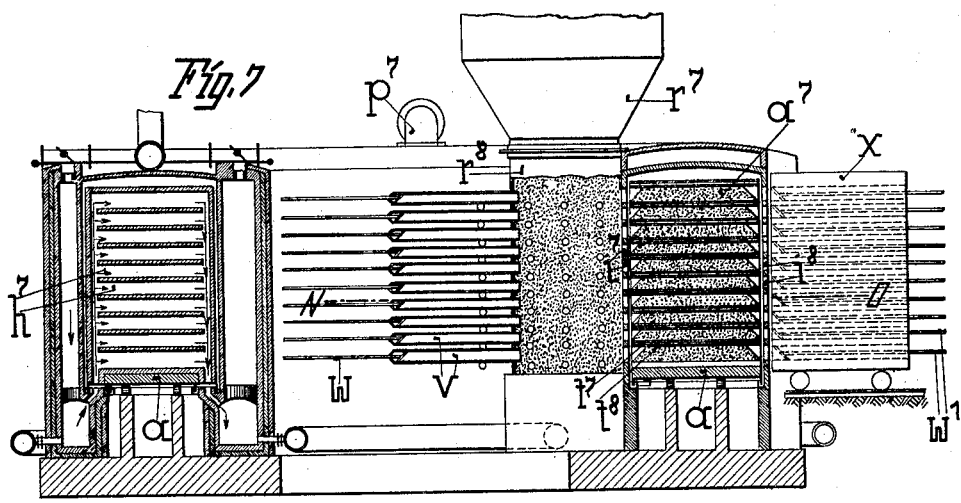

Patented Apr. 12, 1932

1,854,161

UNITED STATES PATENT OFFICE

OTTO HELLMANN, OF BOCHUM, GERMANY

OVEN FOR TREATMENT OF FUEL BY HEAT

Application filed June 1, 1927, Serial No. 195,628, and in Germany June 6, 1926.

My invention relates to an oven intended for the treatment of fuels or fuel-containing material by heat, in particular for smouldering or carbonizing or partly distilling such materials, the material to be treated being stowed in layers on a platform adapted to rotate or to move to and fro. According to my invention the platform is designed so as to be charged and emptied in the manner of the stationary horizontal coke ovens, that means, the material is either poured from above in loose form or is horizontally pushed therein likewise loose or in the form of compressed cakes, whilst the treated material is pushed out by means of a pusher head as with the known horizontal coke ovens. To this end stationary side walls of the oven are provided which surround the platform and are equipped with inner and outer apertures opposite to one another which can be closed. The movable platform has transverse heating walls arranged across its direction of motion, each two heating chambers having between them a carbonizing chamber of nearly or wholly the same width as said apertures and intended to receive the material to be treated. The stationary side walls of the oven, however, which extend in the direction of the motion of the platform have inner and outer apertures. A series of carbonizing compartments opening at the inner and outer ends of the chambers are thus formed on the platform, to which carbonizing compartments the material to be treated may be supplied from above or through one of the two apertures, whilst the finished material may be pushed out from the compartments, after removal of the closure means, by a pusher head moving in the direction of the heating walls. The material to be treated may be brought into each compartment of the platform in a uniformly thick layer. In this case the walls surrounding the platform and also the means for closing the apertures of the walls may be inclined in accordance with the angle of repose of the material, so that the stationary oven walls nearly eliminate the space which would be formed between the material and an ordinary wall. Furthermore a plurality of superimposed compartments may be arranged into which the material is brought in correspondingly thin layers.

Now in case the platform has an annular shape, the heating walls enclosing the compartments for the material to be treated which have parallel or nearly parallel walls, form acute-angled heating chambers. In order to heat as uniformly as possible the compartments for the material to be treated in spite of said acute-angled shape of the heating chamber, a special embodiment of the heating arrangement provides that the heating gases are supplied to the horizontal heating flues of each heating chamber at one or several places distant from the periphery, in addition to the outer periphery. Toward the inner periphery the gases thus supplied separately may be united.

In order to facilitate and accelerate the withdrawal of the volatile constituents produced in the compartments, said compartments are provided with hollow members.

In order to allow my invention to be more easily understood, several embodiments of the same are illustrated by way of example in the drawings which accompany and form part of this specification. In these drawings:

Fig. 1 is a vertical section through an annular rotary oven on line A—B of Fig. 2, Fig. 2 shows this oven partly in top plan view and partly in a horizontal section on line C—D of Fig. 1, Fig. 3 shows another embodiment of the platform in horizontal section on line I—K of Fig. 4, Fig. 4 is a vertical section on line E—F of Fig. 3, Fig. 5 is a vertical section on line G—H of Fig. 3, Fig. 6 shows a third embodiment of the oven being in which the platform carrying the oven chambers reciprocates; being partly a top plan view of the oven and partly a section of the coking chambers.

Figs. 7 to 9 illustrate a fourth embodiment of the oven, and in particular

Fig. 7 shows a vertical central section,

Fig. 8 a vertical section on line L—M of Fig. 9, and

Fig. 9 a top plan view and section on line N—O of Fig. 7.

Referring now first to the oven shown in Figs. 1 and 2, $a$ denotes an annular platform which is rotatably mounted on a foundation $b$. The platform $a$ has mounted on it heating chambers $h$ of triangular section which are equipped with horizontal heating flues $h^1$. The angular shape of the chambers $h$ is so chosen, that they enclose compartments $k$, Fig. 2, bounded by walls parallel to one another or slightly tapering toward the inside, said compartments serving to receive the material to be smouldered or carbonized or partly distilled.

On its outer periphery and inner circumference the platform $a$ is surrounded by stationary tapering oven walls $e$ and $f$, which unite on the top in acute angle or are provided with a horizontal cover $g$, the slope of said walls $e, f$ being so chosen, that the space enclosed by them nearly or wholly corresponds to the natural angle of repose taken by the material when loosely poured in the chamber $k$. Doors $i^1$ and $i^2$, Fig. 1, are provided on two opposite places in the oven walls $e, f$, the width of which doors corresponds to that of the compartments $k$. The doors $i^1$, $i^2$ are likewise inclined according to the angle of repose of the material. A pusher head $v$ is arranged in the circular inner room of the platform $a$ opposite to the door $s$ $i^1, i^2$, to push the finished material out of the compartments $k$. When to be charged with loose material, the compartments $k$ are charged through an opening $o$ of the oven cover $g$, for instance from an overhead storage tank $r$ by means of a conveyer band $n$, or when compressed cakes of material are to be charged these compressed cakes may be pushed in through one of the doors $i^1, i^2$.

The heating flues $h^1$ of all the heating chambers $h$ are in communication on their outer side with an annular channel $c$ arranged in the foundation $b$, whilst their inner side communicates with another annular channel $d$ likewise arranged in the foundation $b$. The ignition of the heating agent (air and gas) takes place in the channel $c$, from where the combustion gases flow through a passage $h^2$ to the flues $h^1$ and returns through a passage $h^3$ to channel $d$ and to a flue duct (not shown). Means for pre-heating the combustible may be arranged in the channel $d$. Toward the channels $c, d$ the platform is sealed by hydraulic closures. The volatile constituents developed in the compartments $k$ are withdrawn through conduits leading from the cover $g$ or by hydraulic mains $p$ and a collecting pipe $q$.

In the operation of the described oven, the platform $a$ is rotated stepwise as required, so that the compartments $k$ arrive successively opposite the doors $i^1, i^2$, whereupon the finished material is successively pushed out by means of pusher $v$. The material falls for instance into a receptacle $m$, on a slope or on a conveyer or the like. The emptied compartment is then charged with fresh material through the opening $o$ or through one of the doors $i^1, i^2$. When the material is charged in loose form, the doors may be so moved toward one another in or after the filling operation, that the charged mass is displaced any desired small distance from the oven walls $e, f$.

In the embodiment illustrated in Figs. 3 to 5, the horizontal flues $h^1$ are subdivided so as to form separate horizontal flues $h^4$. In this case the heating gases entering through passage $h^2$ branch off in three streams $h^4, h^5, h^6$, the streams $h^5, h^6$ passing along the entire length of the compartments $k$, whilst the gas streams $h^4$ first are held away from the compartment walls and consequently begin to deliver their heat to the compartments $k$ only at a more inner section of the heating chamber $h$, where the streams $h^5$, $h^6$ have already partly lost their content of heat.

Instead of being of annular shape, the platform may have a straight shape, as shown in Fig. 6, and may be moved to and fro in a straight oven channel. In this case the heating chambers $h^6$ are not of acute-angled shape, but are rectangular.

In order to facilitate the withdrawal of the volatile constituents developed in the compartments $k$, walls $t$ may be arranged in the latter, as shown by way of example in Figs. 3, 5 and 6, which walls are arranged at suitable distances from each other and have perforations $t^1$. The volatile constituents of each compartment are thus enabled to escape upwardly between these walls $t$ toward the collecting pipes $p, q$ with comparatively small resistance.

In the embodiment illustrated in Figs. 7 to 9 the platform $a$ is of annular shape again and adapted to rotate, but may have, in this case too, the straight shape of Fig. 6 and may move to and fro. Here the platform $a$ carries superimposed compartments $a^7$. The covers of each of these compartments $a^7$ may be provided with passages $t^7$, as shown, to withdraw the developed volatile constituents, and in communication with the appurtenant compartment by perforations $t^8$. The volatile constituents escape from the uppermost compartments $a^7$ through pipes or hydraulic mains $p^7$. The heating of the compartments $a^7$ is effected by heating flues $h^7$. A storage tower $r^7$ is located in the free inner room of the oven at a suitable place, and a container $r^8$ is arranged below said tower. At the place nearest the container $r^8$ the oven walls are provided with openings $i^7$, the width of which at least corresponds to that of the compartments $a^7$, and on the opposite side with openings $i^8$. Furthermore, box-shaped filling devices $v$ are arranged beside the container $r^8$ in the direction of the openings $i^7$, $i^8$ corresponding in number and sectional area to the superimposed compartments $a^7$. A pusher $w$ is guided in each box $v$, whilst opposite the pushers $w$ a collecting receptacle $x$ is arranged on the outer periphery of the oven, in which receptacle similar horizontally shiftable pushers $w^1$ may be arranged.

The mode of operaton of this oven is as follows: The compartments $a^7$ are successively brought opposite the openings $i^7$, $i^8$, the boxes $v$ and the pushers lodged therein being located directly opposite the openings $i^7$ when in the position shown in Fig. 9. Now, when forwarded toward the right, the pushers $w$ shove the finished material of the respective compartments $a^7$ into the receptacle $x$, wherein the material is quenched or from which it is conveyed. Thereupon the boxes $v$ and pushers $w$ return to the position shown in Fig. 7, the container $r^8$ is filled with fresh material from the tower $r^7$, the boxes $v$ with the pushers $w$ are forwarded up to a position opposite the openings $i^7$, then the pushers $w$ are set in motion and shove the material into the compartments $a^7$. In case outer pushers $w^1$ are provided, a certain counter-pressure may be exerted by them on the material pushed into the compartments $a^7$, whereby the material is somewhat compressed. Thereupon the platform $a$ is rotated to such an extent, that the next group of compartments $a^7$ is opposite the openings $i^7$, $i^8$. As the boxes $v$ with the pushers $w$ are still in the right-hand position, Fig. 9, resulting from the preceding operation, the material may be pushed out into the receptacle $x$ by the advancing pushers. Of course, the same mode of operation could be employed with a platform that moves in a straight line.

What I claim as my invention and desire to secure by Letters-Patent, is:—

1. An oven intended for the treatment of fuel or fuel-containing material by heat, comprising a platform movable in a definite path, transverse heating chambers arranged on said platform and located at right angles to the path of motion of the platform, carbonizing compartment each arranged between two of said heating chambers, stationary walls bounding said platform and enclosing both ends of each of said compartments, doors arranged in said walls and located opposite each other, means for closing said doors, said doors having substantially the same width as said carbonizing compartments.

2. An oven intended for the treatment of fuel or fuel-containing material by heat, comprising a platform movable in a definite path, transverse heating chambers arranged on said platform and located at right angles to the path of motion of the platform, carbonizing compartments, each the same size each arranged between two of said heating chambers, stationary walls inclined upwardly of the platform and bounding said platform said walls enclosing both ends of each of said compartments and extending at least approximately in the direction of the angle of repose of the material to be treated, doors arranged in said walls and located opposite each other, means for closing said doors, said doors having substantially the same width as said carbonizing compartments.

3. An oven intended for the treatment of fuel or fuel-containing material by heat, comprising a platform movable in a definite path, transverse heating chambers arranged on said platform and located at right angles to the path of motion of the platform, carbonizing compartments each the same size each arranged between two of said heating chambers each of said compartments being open at both ends thereof, stationary walls inclined upwardly of the platform and bounding said platform, enclosing the ends of each compartment and extending approximately in the direction of the angle of repose of the material to be treated, inclined doors arranged in said walls and located opposite each other, means for closing said doors, said doors having substantially the same width as said carbonizing compartments, said closure means being arranged approximately in the direction of the angle of repose of the material to be treated.

4. An oven intended for the treatment of fuel or fuel-containing material by heat, comprising a platform movable in a definite path, transverse heating chambers arranged on said platform and located at right angles to the path of motion of the platform, carbonizing compartments each of the same size each arranged between two of said heating chambers each of said compartments being open at both ends thereof, stationary walls inclined upwardly of the platform and bounding said platform, enclosing the ends of each compartment and extending approximately in the direction of the angle of repose of the material to be treated, doors arranged opposite each other in said walls and located opposite each other, said doors having substantially the same width as said carbonizing compartments, means for closing said doors and means for varying the distance apart of said closure means.

5. An oven intended for the treatment of fuel or fuel-containing material by heat, comprising an annular rotary platform, heating chambers arranged on said platform and having substantially radially extending vertical walls, carbonizing compartments each of the same size each arranged between two of said heating chambers, stationary walls bounding said platform, doors arranged in said walls and located opposite each other, means for closing said doors, said doors having substantially the same width as said carbonizing compartments.

6. An oven intended for the treatment of fuel or fuel-containing material by heat, comprising an annular rotary platform, heating chambers arranged on said platform and having substantially radially extending vertical walls, horizontal heating flues in said heating chambers, combustible supplying flues arranged within said heating flues for supplying combustion gas at different distances from the outer periphery of said heating chambers, carbonizing compartments each of the same size each arranged between two of said heating chambers and having two of their sides extending substantially radially to one another, stationary walls bounding said platform, doors arranged in said walls and located opposite each other, means for closing said doors, said doors having substantially the same width as said carbonizing compartments.

7. An oven intended for the treatment of fuel or fuel-containing material by heat, comprising a platform movable in a definite path, transverse heating chambers arranged on said platform and located at right angles to the path of motion of the platform, carbonizing compartments each of the same size each arranged between two of said heating chambers the adjacent sides of said carbonizing compartments being perforated and separated so as to provide hollow members between said carbonizing compartments, stationary walls bounding said platform, and oppositely arranged doors in said walls.

8. An oven intended for the treatment of fuel or fuel-containing material by heat, comprising a platform movable in a definite path, transverse heating chambers arranged on said platform and located at right angles to the path of motion of the platform, carbonizing compartments each of the same size each arranged between two of said heating chambers the adjacent sides of said carbonizing compartments being perforated and separated so as to provide hollow members between said carbonizing compartments, stationary walls bounding said platform, doors arranged in said walls and located opposite each other, means for closing said doors, said doors having substantially the same width as said carbonizing compartment.

In testimony whereof, I have signed my name to this specification.

OTTO HELLMANN.